US008511138B2

(12) United States Patent
Larsen et al.

(10) Patent No.: US 8,511,138 B2
(45) Date of Patent: Aug. 20, 2013

(54) PISTON PROVER APPARATUS, METHOD AND SYSTEM

(75) Inventors: Christopher Scott Larsen, Rockford, MN (US); Brian Krafthefer, Stillwater, MN (US)

(73) Assignee: Honeywell International, Inc., Morristown, NJ (US)

( * ) Notice: Subject to any disclaimer, the term of this patent is extended or adjusted under 35 U.S.C. 154(b) by 112 days.

(21) Appl. No.: 13/285,147

(22) Filed: Oct. 31, 2011

(65) Prior Publication Data

US 2013/0104621 A1   May 2, 2013

(51) Int. Cl.
*G01F 25/00*   (2006.01)

(52) U.S. Cl.
USPC .............................. 73/1.19; 73/1.16; 73/1.01

(58) Field of Classification Search
USPC ........................................ 73/1.01, 1.16, 1.19
See application file for complete search history.

(56) References Cited

U.S. PATENT DOCUMENTS

| 5,317,895 | A | | 6/1994 | Ogawa et al. | |
| 5,392,632 | A | | 2/1995 | Umeda et al. | |
| 5,787,940 | A | | 8/1998 | Bonn et al. | |
| 5,974,971 | A | * | 11/1999 | Moller et al. | 101/366 |
| 7,395,690 | B2 | | 7/2008 | Cotton | |
| 7,716,963 | B2 | * | 5/2010 | Bell et al. | 73/1.34 |
| 2005/0217346 | A1 | * | 10/2005 | Nagarkatti et al. | 73/1.16 |
| 2007/0068241 | A1 | * | 3/2007 | Bains | 73/149 |
| 2007/0169537 | A1 | * | 7/2007 | Cotton | 73/1.27 |
| 2008/0083262 | A1 | | 4/2008 | Augenstein et al. | |
| 2009/0293582 | A1 | | 12/2009 | Rudroff | |
| 2010/0011663 | A1 | | 1/2010 | Coyle | |
| 2011/0036178 | A1 | | 2/2011 | Day | |
| 2012/0024037 | A1 | * | 2/2012 | Massey | 73/1.19 |

FOREIGN PATENT DOCUMENTS

JP    364463 B2    4/2005

OTHER PUBLICATIONS

Flow Calibration Systems: Small Volume Compact Prover (Piston Prover), Oval Corp., printed Aug. 24, 2011, 1 page.
Lee, G. D., "Series 1—Small Volume Provers: Identification, Terminology and Definitions," NIST Newsletter (Mar. 2005), http://ts.nist.gov/WeightsAndMeasures/labmetrologypage.cfm, 5 pages.
Lee, D., "Part 2—Small Volume Provers History, Design, and Operation," NIST Newsletter (Jun. 2005), http://ts.nist.gov/WeightsAndMeasures/labmetrologypage.cfm, 6 pages.
Lee, G. D., "Small Volume Proper (SVP) Proving Reports," NIST Newsletter (Mar. 2006). http://ts.nist.gov/WeightsAndMeasures/labmetrologypage.cfm, 6 pages.
Whitman, S. K., "Operational Experiences Proving Mass Flow Meters with Small Volume Provers," *Energy Week Conference and Exhibition* (Feb. 1, 1996), 6 pages.
PCT International Search Report for PCT/US2012/062415 dated Dec. 20, 2012.
Whitman, S., "Operational Experience with Small Volume Provers," Class #4110.1, Coastal Flow Liquid Measurement, Inc., modified Apr. 6, 2007, 5 pages, http://help.Intellisitesuite.com/Hydrocarbon/papers/4110.pdf.

* cited by examiner

*Primary Examiner* — Lisa Caputo
*Assistant Examiner* — Jamel Williams
(74) *Attorney, Agent, or Firm* — Kermit D. Lopez; Luis M. Ortiz; Ortiz & Lopez, PLLC

(57) ABSTRACT

A piston prover apparatus, method and system for accurately measuring the flow rate of a fluid by the measurement of the position of an internal piston. The piston can be integrated with a poppet valve arrangement located within a cylinder in order to permit fluid (e.g., cryogenic fluid) to pass through an orifice passage when the piston is drawn to an upstream position prior to proving the flow. An actuator in association with a motor and an encoder can be located inside the cylinder. The motor drives the piston to the upstream position of the cylinder when a proving run is initiated. Once the piston is released for the proving run, the initial and final positions of the piston can be accurately measured along with the transit time.

20 Claims, 5 Drawing Sheets

PISTON PROVER APPARATUS, METHOD AND SYSTEM

TECHNICAL FIELD

Embodiments are generally related to flow meter proving systems and methods. Embodiments are also related to small volume provers. Embodiments are additionally related to cryogenic and non-cryogenic applications.

BACKGROUND OF THE INVENTION

Flow meters, provers, and flow proving components utilize a known traceable volume to simulate actual operating conditions and to test and verify their performance. A SVP (Small Volume Prover), or piston prover, can be employed to accurately measure flow in a fluid flow process and to calibrate, for example, a flow measurement device employed in custody transfers, pipe lines, etc. Small volume provers generally include a precision bore cylinder with sensors that detect the initiation and termination of the stroke of a piston. The piston is driven upstream against the fluid flow and then released to travel with the fluid flow to measure the flow rate of the fluid.

Small volume provers typically include a piston rod connected to the piston that protrudes outside the prover in order to pull the piston to an upstream position by an external motor. FIG. 1 illustrates a perspective view of a prior art small volume prover 100 having a piston rod 135 that exits the prover 100. The small volume prover 100 includes a cylinder 120 having a flow inlet 110 and a flow outlet 190. A piston 130 configured with a poppet valve arrangement 140 is located within the bore cylinder 120. The piston 130 can be driven upstream via the external motor connected to the piston rod 135 that exits a prover housing 195. The external rod 135 can be sealed to the prover housing 195.

One of the problems associated with such prover designs is that the piston rod seal can leak temporarily from contaminant interference contained within the fluid, contaminants outside the prover volume, or forces of the rod 135 on the prover seals; and as a result, seal wear and/or damage can occur during operation of the prover 100. Additionally, such a rod seal can leak as the rod 135 moves in and out of the cylinder 120, particularly if the fluid has a low viscosity, lubricity, and temperature. For example, in the case of LNG (Liquefied Natural Gas), the leaking fluid is flammable and can cause a potential environmental hazard. Furthermore, seal leakage results in inaccurate flow measurement.

Based on the foregoing, it is believed that a need exists for an improved piston prover apparatus and method for providing accurate position measurement, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved meter proving apparatus, method and system.

It is another aspect of the disclosed embodiments to provide for an improved piston prover apparatus, method and system for accurately measuring a piston position within a flow tube.

The aforementioned aspects and other objectives and advantages can now be achieved as described herein. A piston prover apparatus, method and system for accurately measuring the flow rate of the fluid by the measurement of the position of an internal piston are disclosed herein. In general, the piston can be integrated with a poppet valve arrangement located within a cylinder (e.g., precision bore cylinder) in order to permit fluid (e.g., cryogenic fluid) to pass through an orifice passage when the piston is drawn to an upstream position prior to proving the flow.

An actuator (e.g., linear actuator) having a motor (e.g., submersible LNG linear motor), a leadscrew, and an encoder can be located inside the cylinder. The motor drives the piston to the upstream position of the cylinder when a proving run is initiated. Once the piston is released for the proving run, an initial and final position of the piston is accurately measured along with the transit time. The encoder integrated with the actuator and the piston provides an output signal indicative of the initial and final positions of the piston to determine the volume of the fluid displaced by the movement of the piston. The piston velocity can be precisely measured and the cylinder volume is calibrated to determine the flow rate with high accuracy and repeatability.

A processor can be employed to calibrate the fluid flow utilizing a double chronometry pulse interpolation approach, which also provides for fractional meter pulse counting. The linear actuator can push and/or pull the prover piston, which no longer exits the cylinder. The linear actuator leadscrew mounted to the linear actuator can be modified to maintain tight tolerances at low temperature. The piston can back drive the actuator leadscrew, if the actuator remains connected to the prover piston while the fluid flow pushes the piston back downstream. If the back drive force of the actuator leadscrew affects the flow of the piston, the actuator leadscrew can be disengaged from the piston using a latch (e.g., spring-loaded latch or similar arrangement).

The motor can be placed along with the actuator in the cylinder to drive the actuator engineered for a low temperature environment. A wiring for the motor can exit the prover through a potted seal. The motor can be, for example, a linear motor with coils oriented in a straight line to drive a magnet and/or a metal blade in a linear direction. The linear motor actuator includes an epoxy-potted coil that can withstand an LNG (Liquefied Natural Gas) environment. The linear motor can remain connected to the prover piston and provide accurate position measurement data with minimal resistance to the fluid flow. The encoder integrated with the actuator precisely measures the piston location in the cylinder thereby providing accurate position measurement information.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
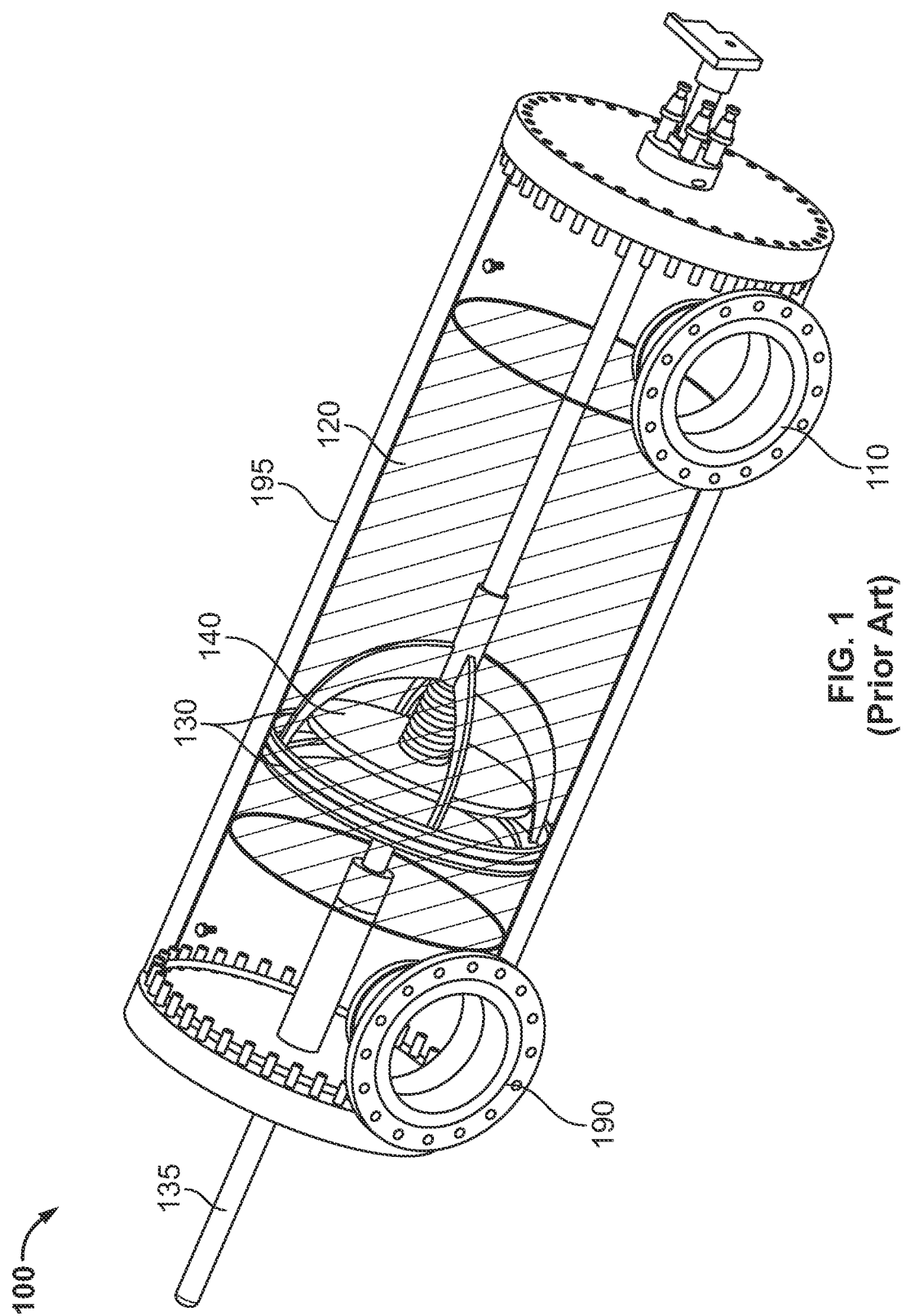
FIG. 1 illustrates a perspective view of a piston prover having a piston rod that exits the prover.
Figure 2:
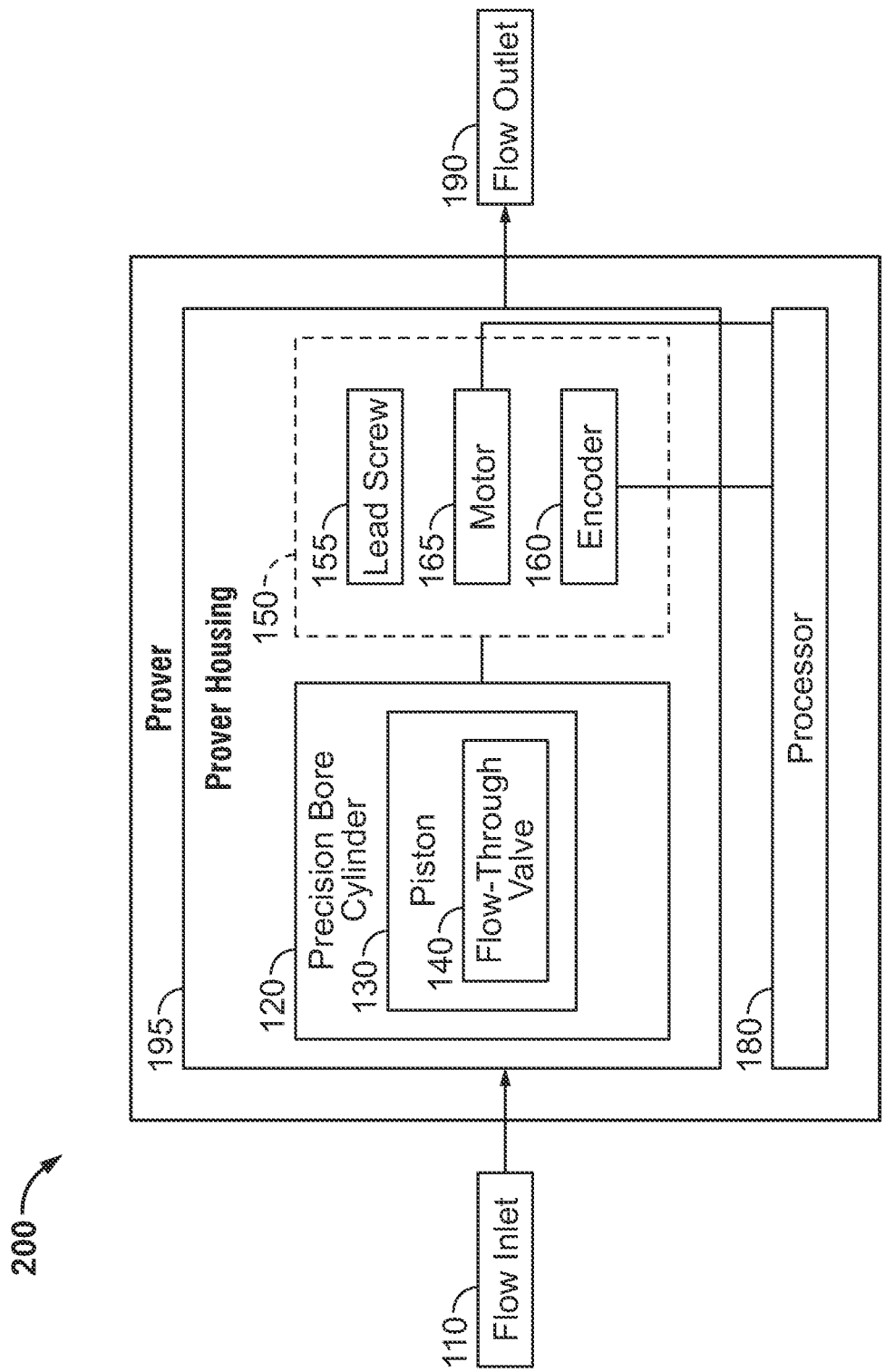
FIG. 2 illustrates a block diagram of a piston prover apparatus, in accordance with the disclosed embodiments.

FIG. 2 illustrates a block diagram of a piston prover apparatus 200 having an actuator 150 located inside the prover apparatus 200, in accordance with the disclosed embodiments. The apparatus 200 can function based on a simple mechanical operation, with no hydraulics or pneumatics. The apparatus 200 provides a constant temperature with respect to the fluid stream and maintains a constant base volume of a measuring conduit by minimizing a differential pressure of fluids in and around the measuring conduit. The apparatus 200 can utilize an electronic pulse-counting technique such as, for example, a double chronometry operation for calibrating the flow rate of a fluid. The piston prover apparatus 200 can be employed for measurement of cryogenic liquids such as, for example, LNG.

In general, LNG such as, for example, liquid methane can be created by cooling natural gas to a temperature of −260° F. At that temperature, natural gas becomes a liquid and its volume is reduced 615 times. Liquefied natural gas is easier to store than the gaseous form since it takes up much less space. LNG is also easier to transport. Cryogenic fluids, such as liquefied oxygen, and particularly cryogenic hydrocarbons used in fuel dispensing operations, such as compressed and liquefied hydrocarbon gas, typically natural gas, which is mostly methane, are often used for powering engines, and particularly vehicle engines, for some time. In particular, liquefied natural gas, or LNG, is normally stored at temperatures of between −40° F. and −200° F., and at pressures of about 50-100 psig.

The apparatus 200 generally includes a cylinder 120 (e.g., a flow tube, a precision bore cylinder, etc.) having an inlet port 110 and an outlet port 190. The apparatus 200 further includes a piston 130 configured with a poppet valve arrangement 140 located inside the cylinder 120 in order to permit fluid (e.g., cryogenic fluid) to pass through an orifice passage when the piston 130 is drawn to an upstream position prior to proving the flow. Note that the piston 130 is preferably a low-drag piston. It can be appreciated, however, that in some embodiments piston 130 may be another type of piston, not necessarily a low-drag piston. Note also that in some embodiments the cylinder 120 may form a part of a pipeline or can be provided in the shape of a pipe. The cylinder 120 has a known volume, which can be verified utilizing a water draw procedure. The cylinder 120 can function as the measurement chamber of the apparatus 200.

The piston 130 can be configured from a material that is appropriate for the prover operating pressure, temperature, and desired resistance to degradation by the fluid that is being metered. An actuator 150 having a leadscrew 155, a motor 165, and an encoder 160, can be located within a prover housing 195. The motor 165 drives the piston 130 to the upstream position of the cylinder 120 when a proving run is initiated. Once the piston 130 is released for the proving run, the initial and final positions of the piston 130 are accurately measured along with the transit time. The encoder 160 integrated with the actuator 150 and the piston 130 provides an output signal indicative of the initial and final positions of the piston 130 to determine the volume of the fluid displaced by the movement of the piston 130.

A processor 180 configured in association with the apparatus 200 can be employed to calibrate the fluid flow utilizing a double chronometry pulse interpolation approach, which also provides fractional meter pulse counting. The processor 180 is connected to the encoder 160 and the motor 165 to control and monitor the movement of the actuator 150. The processor 180 can be, for example, a data processing system such as, for example, a simple microprocessor or IC chip, a desktop or laptop computer, a server, networked computing devices, and other processing devices such as pad computing devices (e.g., iPad type devices), and so forth. Such prover apparatus 200 associated with the internal actuator 150 can be employed for accurate variable volume calibration.

Figure 3:
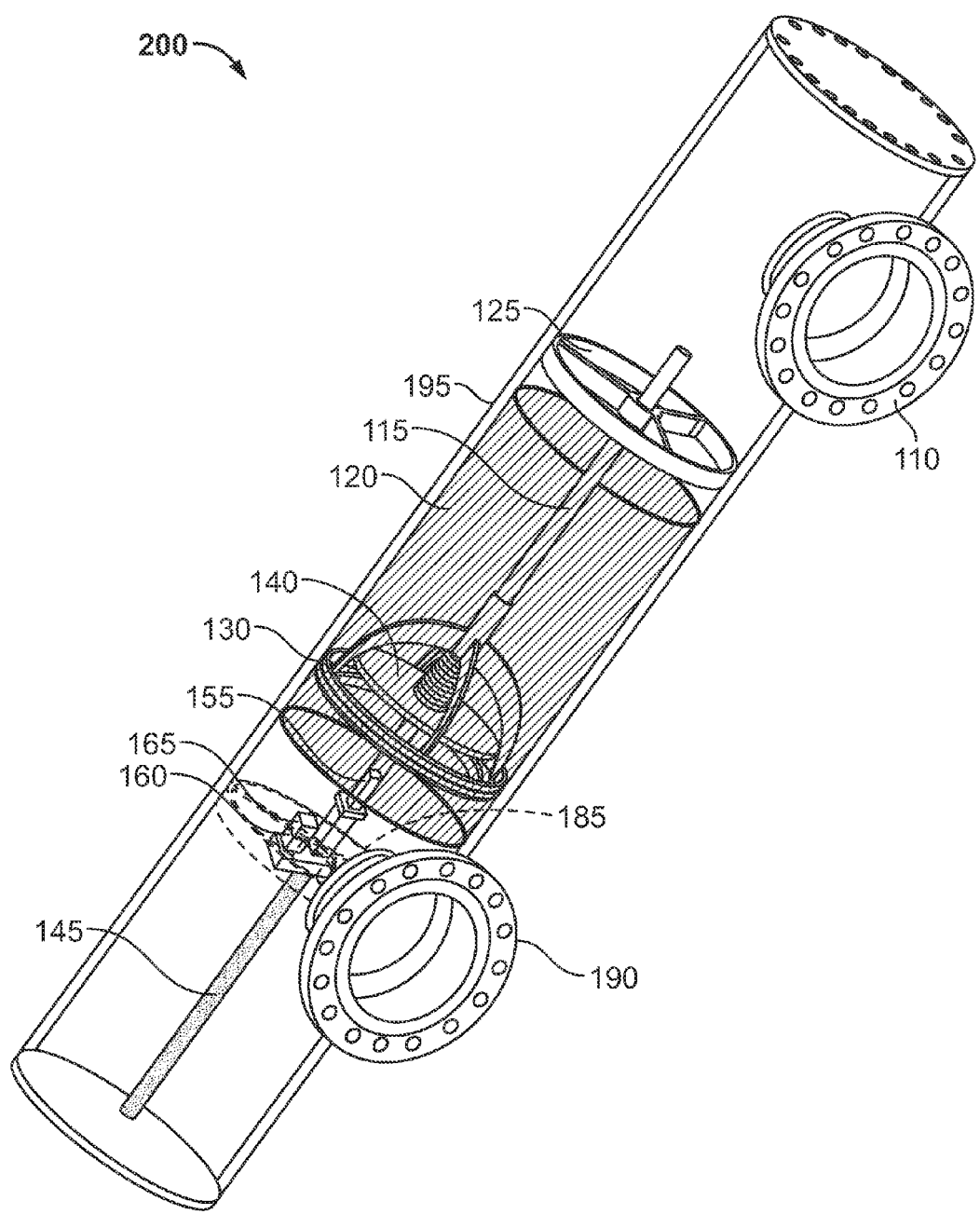
FIG. 3 illustrates a perspective view of the piston prover apparatus, in accordance with the disclosed embodiments.

FIG. 3 illustrates a perspective view of the piston prover apparatus 200, in accordance with the disclosed embodiments. Note that in FIGS. 1-6, identical or similar blocks are generally indicated by identical reference numerals. The piston prover apparatus 200 includes a shaft support 125 for supporting a shaft 115 and an actuator support 185 for supporting the actuator 150. A rear protruding gear 145 accommodates the travel of the shaft 125 and the leadscrew 155. The motor 165 can be placed along with the encoder 160 in the cylinder 120 to drive the actuator 150 engineered for a low temperature environment. The piston 130 can be positioned and launched via, for example, a chain drive mechanism. In such a chain drive mechanism scenario, a standby mode for the piston 130 can be, for example, the downstream position with the valve 140 open. The chain drive mechanism can pull the piston 130 to the upstream position. The piston 130 is then released and the valve 140 closes to start a proving run. The piston 130 can start the encoder 160 data acquisition as it travels the length of the calibrated section (e.g., precision bore cylinder) of the prover apparatus 200.

A signal can be transmitted to the processor 180 to start a timing sequence when the actuator 150 is actuated after the piston 130 has been released and synchronized with the fluid flow. The flow-through valve 140 located inside the piston 130 is closed during movement of the piston 130 from the upstream to the downstream position with velocity of the fluid, displacing a certified volume. A signal is transmitted to the processor 180 to stop the timing sequence upon reaching an end of the actuator 150. The encoder 160 provides an output signal indicative of the initial and final position of the piston 130 to determine the volume of the fluid displaced by the movement of the piston 130. The flow-through valve 140 is opened when the valve 140 moves from the downstream to the upstream position in order to permit the fluid to flow freely through the cylinder 120 with an insignificant pressure loss.

The fluid pressure in the apparatus 200 generally pushes the perimeter of the piston 130 further downstream, opening the flow-through valve 140, thereby permitting the flow to continue with little to no pulsation or surge in line pressure. The piston 130 generally travels at the same rate of the liquid and starts the encoder 160 data acquisition in order to determine the measure of flow rate. The double chronometry approach provides exact time discrimination and pulse counting, which achieves a higher accuracy in calibration of the fluid flow. The measurement of fluid flow, temperature, pressure, and the position of the piston 130 can be determined utilizing the processor 180.

Figure 4:
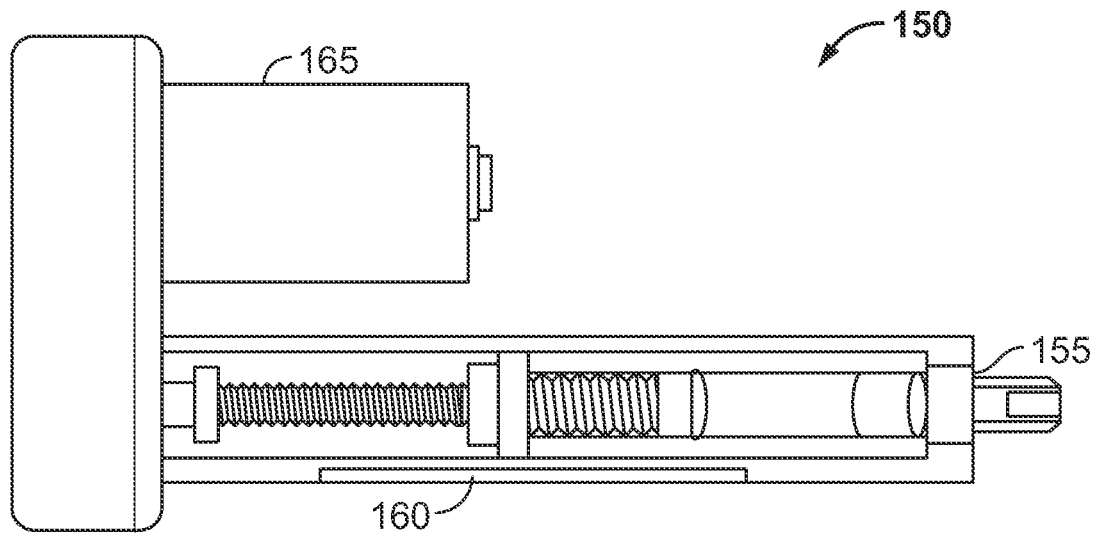
FIG. 4 illustrates a perspective view of an actuator having motor, encoder, and leadscrew, in accordance with the disclosed embodiments.

FIG. 4 illustrates a perspective view of the actuator 150 having the motor 165, the encoder 160, and the leadscrew 155, in accordance with the disclosed embodiments. Note that the actuator 150 can be, for example, a linear actuator, depending upon design considerations. It can be appreciated that other types of actuators may be utilized in place of the suggested actuator. The linear actuator motor 165 may have an epoxy-potted coil that can withstand a LNG environment. The linear actuator 150 may push or pull the prover piston 130 and the piston rod 135 no longer needs to exit the prover housing 195. The linear actuator leadscrew 155 mounted to the linear actuator 150 can be modified to maintain tight tolerances at low temperatures.

The piston 130 can back drive the actuator leadscrew 155 if the actuator 150 remains connected to the prover piston 130 while the fluid flow pushes the piston 130 back downstream. If the back drive force of the actuator leadscrew 155 affects the flow of the piston 130, the actuator leadscrew 155 can be disengaged from the piston 130 using a latch (e.g., spring-loaded latch or similar arrangement). The linear actuator leadscrew 155 must be compatible with the cryogenic fluid. The linear actuator 150 provides at least 1000 lbs force for a large prover. The motor 165 and the encoder 160 can be assembled together before the rotational motion is turned into linear motion. The encoder can be also a linear potentiometer located in association with the leadscrew 155, as shown in FIG. 4

The motor 165 can be placed along with the leadscrew 155 in the cylinder 120 to drive the actuator 150 engineered for a low temperature environment. The encoder 160 integrated with the actuator 150 can be employed for precisely measuring location of the piston 130 in the cylinder 120 in order to provide accurate position measurement. This minimizes the complexity of measuring the position of the piston 130 inside the cylinder 120. Note that in an alternative embodiment, separate position measuring sensors can be utilized to measure the piston position if the back-drive force requires detachment of the leadscrew 155 from the piston 130.

Figure 5:
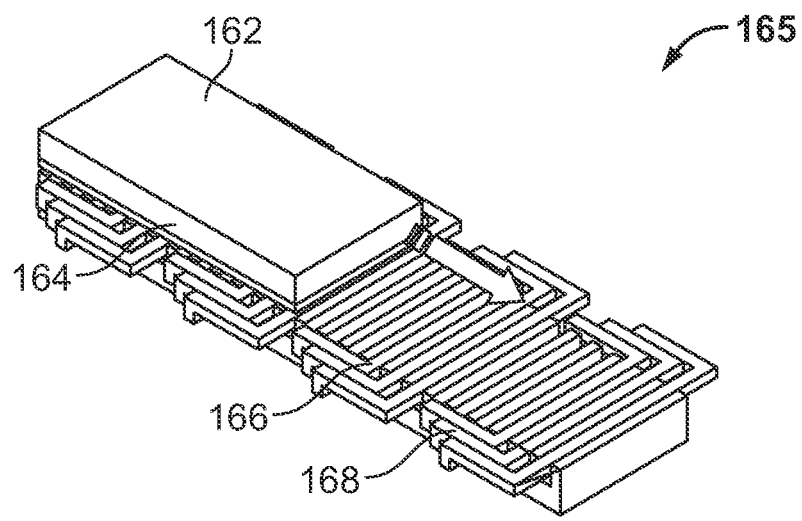
FIG. 5 illustrates a perspective view of a linear motor, in accordance with the disclosed embodiments.

FIG. 5 illustrates a perspective view of the linear motor 165, in accordance with the disclosed embodiments. Note that the motor 165 can be, for example, a linear motor, depending upon design considerations. It can be appreciated that other types of motors may be utilized in place of the suggested motor. The linear motor 165 is essentially a rotary electric motor laid down on the cylinder 120. The motor 165 moves in a linear fashion. The linear motor 165 includes a stator 166, a mover 162, and coils 168 oriented in a straight line to drive a magnet 164 and/or a metal blade in a linear direction. The linear motor 165 can stay connected to the prover piston 130 and provide accurate position measurements while providing minimal resistance to the fluid flow. A wiring for the motor 165 can exit the prover housing 195 through a potted seal.

Figure 6:
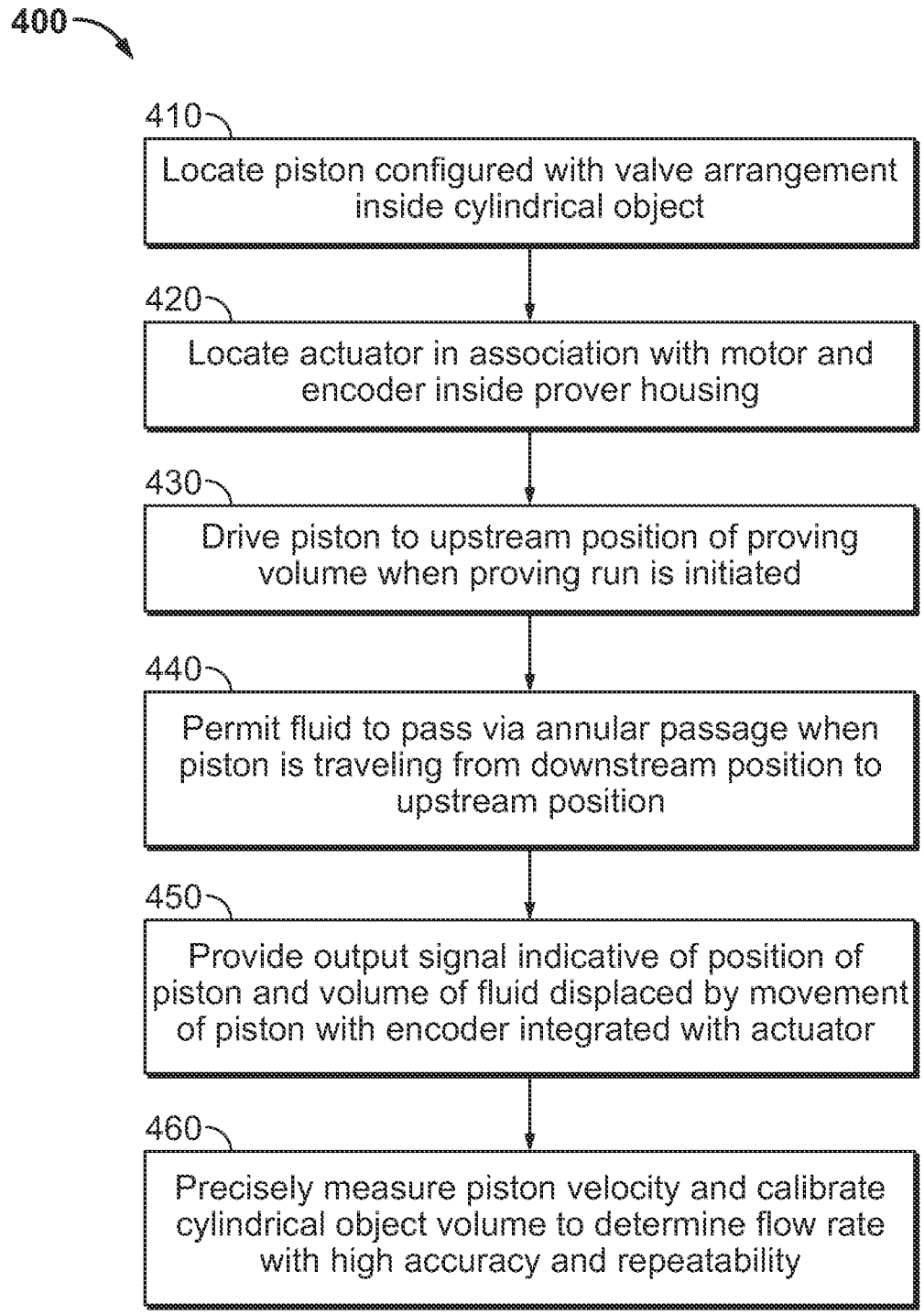
FIG. 6 illustrates a high level flow chart of operation illustrating logical operational steps of the method for accurately measuring position of a piston in the piston prover apparatus, in accordance with the disclosed embodiments.

FIG. 6 illustrates a high level flow chart of operation illustrating logical operational steps of the method 400 for accurately measuring position of the piston 130 in the precision bore cylinder 120, in accordance with the disclosed embodiments. Initially, the piston 130 integrated with the poppet valve arrangement 140 can be located inside the cylinder 120, as indicated at block 410. The actuator 150 in association with the motor 165 and the encoder 160 can be located inside the prover housing 195, as shown at block 420.

The motor 165 drives the piston 130 to the upstream position of proving volume when a proving run is initiated, as depicted at block 430. Thereafter, as illustrated at block 440, fluid (e.g., cryogenic fluid) can be passed through an orifice passage when the piston 130 is traveling from the downstream position to the upstream position. The encoder 160 integrated with the actuator 150 and the piston 130 provides an output signal indicative of the movement of the piston 130 and a volume of fluid displaced by the movement of the piston 130, as shown at block 450. Finally, the velocity of the piston 130 can be precisely measured and the cylinder volume is calibrated to determine the flow rate with high accuracy and repeatability, as shown at block 460.

Based on the foregoing, it can be appreciated that a number of embodiments, preferred and alternative, are disclosed herein. For example, in one embodiment, a piston prover apparatus for measuring the flow of cryogenic and non-cryogenic fluids is disclosed. Such an apparatus can include a piston supported by and housed within a cylinder, the piston configured with a flow-through valve arrangement that allows a fluid to pass through an orifice passage when the piston is not making flow measurements and also when the piston travels from a downstream position to an upstream position; and an actuator in association with a motor maintained by and housed within the cylinder, wherein the motor drives the piston to the upstream position of the cylinder when a proving run is initiated.

In another embodiment, such an apparatus can further include an encoder integrated with the actuator, wherein the encoder is located with the cylinder to precisely measure a location of the piston in the cylinder and generate an output signal indicative of a position of the piston and a volume of fluid displaced by a movement of the piston in association with data indicative of the flow rate of the fluid. In yet another embodiment, such an apparatus can include an outlet port and an inlet port located at the cylinder. In still other embodiments, such an apparatus can further include a processor for calculating the flow rate of the fluid utilizing double chronometry pulse interpolation that provides fractional meter pulse counting. Such a processor can be employed in the calibration of flow meters.

In another embodiment, a leadscrew can be integrated with the actuator, the actuator modified to maintain tolerance at low temperature of a cryogenic fluid such that the leadscrew is back driven by the piston if the actuator remains connected to the piston while the fluid flow pushes the piston back to the downstream position. In still another embodiment, the actuator leadscrew can be disengaged from the piston utilizing a latch if a back drive force of the actuator leadscrew affects a flow of the piston. In yet another embodiment, a position sensor can be located and positioned within the cylinder to precisely measure a location of the piston in the cylinder and provide an output signal indicative of a position of the piston and a volume of fluid displaced by a movement of the piston in association with data indicative of a flow rate of the fluid.

In another embodiment, a wiring for the motor can be employed, which exits the cylinder via a potted seal. In another embodiment, the actuator can be a linear actuator. In yet another embodiment, the actuator can be a linear motor. In still another embodiment, the aforementioned fluid can be a cryogenic or non-cryogenic fluid. In other embodiments, the aforementioned cylinder can be a precision bore cylinder. Still, in other embodiments, a processor can be employed, which initiates a proving run and signals the motor to pull the piston into the upstream position in order to unlatch the piston from a chain drive return mechanism.

In yet another embodiment, a method for measuring a flow of cryogenic and non-cryogenic fluids can be implemented. Such a method can include, for example, operations for allowing a fluid to pass through an orifice passage when a piston configured with a flow-through valve arrangement supported by and housed within a cylinder is not making flow measurements and when the piston travels from a downstream position to an upstream position; and driving the piston to the upstream position of the cylinder when a proving run is initiated by a motor integrated with an actuator maintained by and housed within the cylinder.

In another embodiment, operations can be provide for measuring the location of the piston in the cylinder via an encoder integrated with the actuator and the location of the piston within the cylinder, and generating an output signal indicative of the position of the piston and a volume of fluid displaced by the movement of the piston in association with the flow rate of the fluid. In still another embodiment, operations can be provided for integrating a leadscrew with the actuator and modifying the actuator to maintain a tolerance at a low temperature of a cryogenic fluid such that the leadscrew is back driven by the piston if the actuator remains connected to the piston while the fluid flow pushes and returns the piston to the downstream position.

In other embodiments, operations can be provided for initiating a proving run via an interaction with a processor and signaling the motor to pull the piston into the upstream position in order to unlatch the piston from a chain drive return mechanism. In other embodiments, operations can be provided for transmitting a signal to the processor to initiate a timing sequence when the actuator is actuated; after the piston is released and synchronized with the fluid flow; and closing the flow-through valve located inside the piston during a movement of the piston from the upstream to a downstream position with velocity of the fluid, displacing a certified volume.

In still other embodiments, operations can be provided for transmitting a signal to the processor to terminate the timing sequence upon attaining an end of the actuator, the encoder providing an output signal indicative of an initial and final position of the piston to determine the volume of the fluid displaced by the movement of the piston, and opening the flow-through valve when the valve moves from the downstream to the upstream position in order to permit the fluid to flow freely through the cylinder with an insignificant pressure loss. In still other embodiments, the aforementioned fluid may be a cryogenic fluid or a non-cryogenic fluid.

In still other embodiments, a system can be provided for measuring a flow of cryogenic and non-cryogenic fluids. Such a system can include a piston supported by and housed within a cylinder, said piston configured with a flow-through valve arrangement that allows a fluid to pass through an orifice passage when said piston is not making flow measurements and also when said piston travels from a downstream position to an upstream position. Such a system can further include an actuator in association with a motor maintained by and housed within said cylinder, wherein said motor drives said piston to said upstream position of said cylinder when a proving run is initiated. Such a system can further include an encoder integrated with said actuator, wherein said encoder is located within said cylinder to precisely measure a location of the piston in the cylinder and generate an output signal indicative of a position of the piston and a volume of fluid displaced by a movement of the piston in association with data indicative of a flow rate of the fluid.

Note that in other embodiments of such a system, an outlet port and an inlet port can be located at the cylinder. In other embodiments of such a system, a processor can be employed for calculating the flow rate of the fluid utilizing double chronometry pulse interpolation that provides fractional meter pulse counting. Such a processor can be employed in the calibration of flow meters.

In still another embodiment of such a system, a leadscrew can be integrated with the actuator, the actuator modified to maintain tolerance at low temperatures of a cryogenic fluid such that the leadscrew is back driven by the piston if the actuator remains connected to the piston while the fluid flow pushes the piston back to the downstream position. In still another embodiment, the actuator leadscrew can be disengaged from the piston utilizing a latch if a back drive force of the actuator leadscrew affects a flow of the piston. In yet another embodiment of such a system, a position sensor can be located and positioned within the cylinder to precisely measure a location of the piston in the cylinder and provide an output signal indicative of a position of the piston and a volume of fluid displaced by a movement of the piston in association with data indicative of a flow rate of the fluid.

In still another embodiment of such a system, a wiring for the motor can be employed, which exits the cylinder via a potted seal. In another embodiment of such a system, the actuator can be a linear actuator. In yet another embodiment, the actuator can be a linear motor. In still another embodiment of such a system, the aforementioned fluid can be a cryogenic or non-cryogenic fluid. In other embodiments, the aforementioned cylinder can be a precision bore cylinder. Still, in other embodiments of such a system, a processor can be employed, which initiates a proving run and signals the motor to pull the piston into the upstream position in order to unlatch the piston from a chain drive return mechanism.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A piston prover apparatus for measuring a flow of cryogenic and non-cryogenic fluids, said apparatus comprising:
a piston supported by and housed within a cylinder, said piston configured with a flow-through valve arrangement that allows a fluid to pass through an orifice passage when said piston is not making flow measurements and also when said piston travels from a downstream position to an upstream position; and an actuator in association with a motor maintained by and housed within said cylinder, wherein said motor drives said piston to said upstream position of said cylinder when a proving run is initiated.

2. The apparatus of claim 1 further comprising an encoder integrated with said actuator, wherein said encoder is located with said cylinder to precisely measure a location of said piston in said cylinder and generate an output signal indicative of a position of said piston and a volume of fluid displaced by a movement of said piston in association with data indicative of a flow rate of the fluid.

3. The apparatus of claim 1 further comprising an outlet port and an inlet port located at said cylinder.

4. The apparatus of claim 1 further comprising a processor for calculating the flow rate of said fluid utilizing double chronometry pulse interpolation that provides fractional meter pulse counting.

5. The apparatus of claim 1 further comprising a leadscrew integrated with said actuator, said actuator modified to maintain tolerance at low temperatures of a cryogenic fluid such that said leadscrew is back driven by said piston if said actuator remains connected to said piston while said fluid flow pushes said piston back to said downstream position.

6. The apparatus of claim 5 wherein said actuator leadscrew is disengaged from said piston utilizing a latch if a back drive force of said actuator leadscrew affects a flow of said piston.

7. The apparatus of claim 6 further comprising a position sensor located within said cylinder to precisely measure a location of said piston in said cylinder and provide an output signal indicative of a position of said piston and a volume of fluid displaced by a movement of said piston in association with data indicative of a flow rate of the fluid.

8. The apparatus of claim 1 further comprising a wiring for said motor that exits said cylinder via a potted seal.

9. The apparatus of claim 1 wherein said actuator comprises a linear actuator.

10. The apparatus of claim 1 wherein said actuator comprises a linear motor.

11. The apparatus of claim 1 wherein said fluid comprises a cryogenic or non-cryogenic fluid.

12. The apparatus of claim 1 wherein said cylinder comprises a precision bore cylinder.

13. The apparatus of claim 7 wherein said processor initiates a proving run and signals said motor to pull said piston into said upstream position in order to unlatch said piston from a chain drive return mechanism.

14. A method for measuring a flow of cryogenic and non-cryogenic fluids, said method comprising:
allowing a fluid to pass through an orifice passage when a piston configured with a flow-through valve arrangement supported by and housed within a cylinder is not making flow measurements and when said piston travels from a downstream position to an upstream position; and
driving said piston to said upstream position of said cylinder when a proving run is initiated by a motor integrated with an actuator maintained by and housed within said cylinder.

15. The method of claim 14 further comprising:
measuring a location of said piston in said cylinder via an encoder integrated with said actuator and a location of said piston within said cylinder; and
generating an output signal indicative of a position of said piston and a volume of fluid displaced by a movement of said piston in association with a flow rate of said fluid.

16. The method of claim 14 further comprising:
integrating a leadscrew with said actuator; and
modifying said actuator to maintain a tolerance at a low temperature of a cryogenic fluid such that said leadscrew is back driven by said piston if said actuator remains connected to said piston while said fluid flow pushes and returns said piston to said downstream position.

17. The method of claim 14 further comprising:
initiating a proving run via an interaction with a processor; and
signaling said motor to pull said piston into said upstream position in order to unlatch said piston from a chain drive return mechanism.

18. The method of claim 14 further comprising:
transmitting a signal to said processor to initiate a timing sequence then said actuator is actuated and after said piston is released and synchronized with said fluid flow; and
closing said flow-through valve located inside said piston during a movement of said piston from said upstream to a downstream position with velocity of said fluid, displacing a certified volume.

19. The method of claim 14 further comprising:
transmitting a signal to said processor to terminate said timing sequence upon attaining an end of said actuator, said encoder providing an output signal indicative of an initial and final position of said piston to determine said volume of said fluid displaced by the movement of said piston; and
opening said flow-through valve when said valve moves from said downstream to said upstream position in order to permit said fluid to flow freely through said cylinder with an insignificant pressure loss.

20. A system for measuring a flow of cryogenic and non-cryogenic fluids, said system comprising:
a piston supported by and housed within a cylinder, said piston configured with a flow-through valve arrangement that allows a fluid to pass through an orifice passage when said piston is not making flow measurements and also when said piston travels from a downstream position to an upstream position;
an actuator in association with a motor maintained by and housed within said cylinder, wherein said motor drives said piston to said upstream position of said cylinder when a proving run is initiated; and
an encoder integrated with said actuator, wherein said encoder is located within said cylinder to precisely measure a location of said piston in said cylinder and generate an output signal indicative of a position of said piston and a volume of fluid displaced by a movement of said piston in association with data indicative of a flow rate of the fluid.

* * * * *